United States Patent
Bandekar et al.

(10) Patent No.: US 11,558,281 B2
(45) Date of Patent: Jan. 17, 2023

(54) SHARED ETHERNET SEGMENT IDENTIFIER LABEL ALLOCATION FOR ETHERNET VIRTUAL PRIVATE NETWORK MULTIHOMING

(71) Applicant: Arista Networks, Inc., Santa Clara, CA (US)

(72) Inventors: Vishal Bandekar, Karnataka (IN); Ramakrishnan Ganapathy Iyer, Kerala (IN); Vijay Mahadevan, Milpitas, CA (US); Rajesh Semwal, Sunnyvale, CA (US); Victor Wen, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 31 days.

(21) Appl. No.: 17/218,973

(22) Filed: Mar. 31, 2021

(65) Prior Publication Data

US 2022/0321448 A1    Oct. 6, 2022

(51) Int. Cl.
*H04L 45/02* (2022.01)
*H04L 45/50* (2022.01)
*H04L 12/46* (2006.01)

(52) U.S. Cl.
CPC .......... *H04L 45/02* (2013.01); *H04L 12/4641* (2013.01); *H04L 45/507* (2013.01)

(58) Field of Classification Search
CPC .... H04L 45/02; H04L 12/4641; H04L 45/507
See application file for complete search history.

(56) References Cited

U.S. PATENT DOCUMENTS 8,953,590 B1 *   2/2015   Aggarwal ........... H04L 12/4675
                                                    370/409

OTHER PUBLICATIONS

A. Sajassi et al."RFC 7432—BGP MPLS-Based Ethernet VPN", RFC 7432—BGP MPLS-Based Ethernet VPN, Internet Engineering Task Force (IETF), Feb. 2015, 57 pages.

* cited by examiner

Primary Examiner — Kibrom T Hailu
(74) Attorney, Agent, or Firm — Fountainhead Law Group P.C.

(57) ABSTRACT

Systems and methods are provided herein for allocating the same ESI label on multihomed peers for a given ES. In some embodiments, each network device that provides multihoming to a host using an ES, advertises EVPN AD per ES routes to each other, wherein the EVPN AD per ES routes comprise an ESI label associated with the ES. Because the network devices advertise the same ESI label for the ES, a first network device generates a bitmap. The first network device uses the bitmap to include the advertised ESI label in replicated packets that the first network device forwards to the other network devices that provide multihoming to the host via the ES. The network devices that consider themselves non-DF devices will drop the packet. The network devices that consider themselves the DF device will not forward the packet to the host via the ES because of the ESI label.

20 Claims, 6 Drawing Sheets

400

402
Receive EVPN AD per ES routes from all of the redundant network devices of a multihoming group, wherein the EVPN AD per ES routes comprises an ESI label

404
Receive a data packet via the ES from a first host, wherein the data packet is a broadcast packet, unknown-unicast packet, or a multicast packet

406
Replicate the data packet to generate a plurality of replicated data packets, wherein the plurality of replicated data packets comprises the ESI label

408
Transmit the plurality of data packets to each network device providing multihoming to the host using the ES

FIG. 4

SHARED ETHERNET SEGMENT IDENTIFIER LABEL ALLOCATION FOR ETHERNET VIRTUAL PRIVATE NETWORK MULTIHOMING

BACKGROUND

The present disclosure relates to allocating ethernet segment identifier (ESI) labels in an Ethernet Virtual Private Network (EVPN) environment where the network is multihoming traffic using multiprotocol label switching (MPLS).

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which:

FIG. 4 is another flowchart of an illustrative process for allocating the same ESI label on multihomed peers for a given ES, in accordance with some embodiments of the disclosure.

DETAILED DESCRIPTION

Figure 1A:
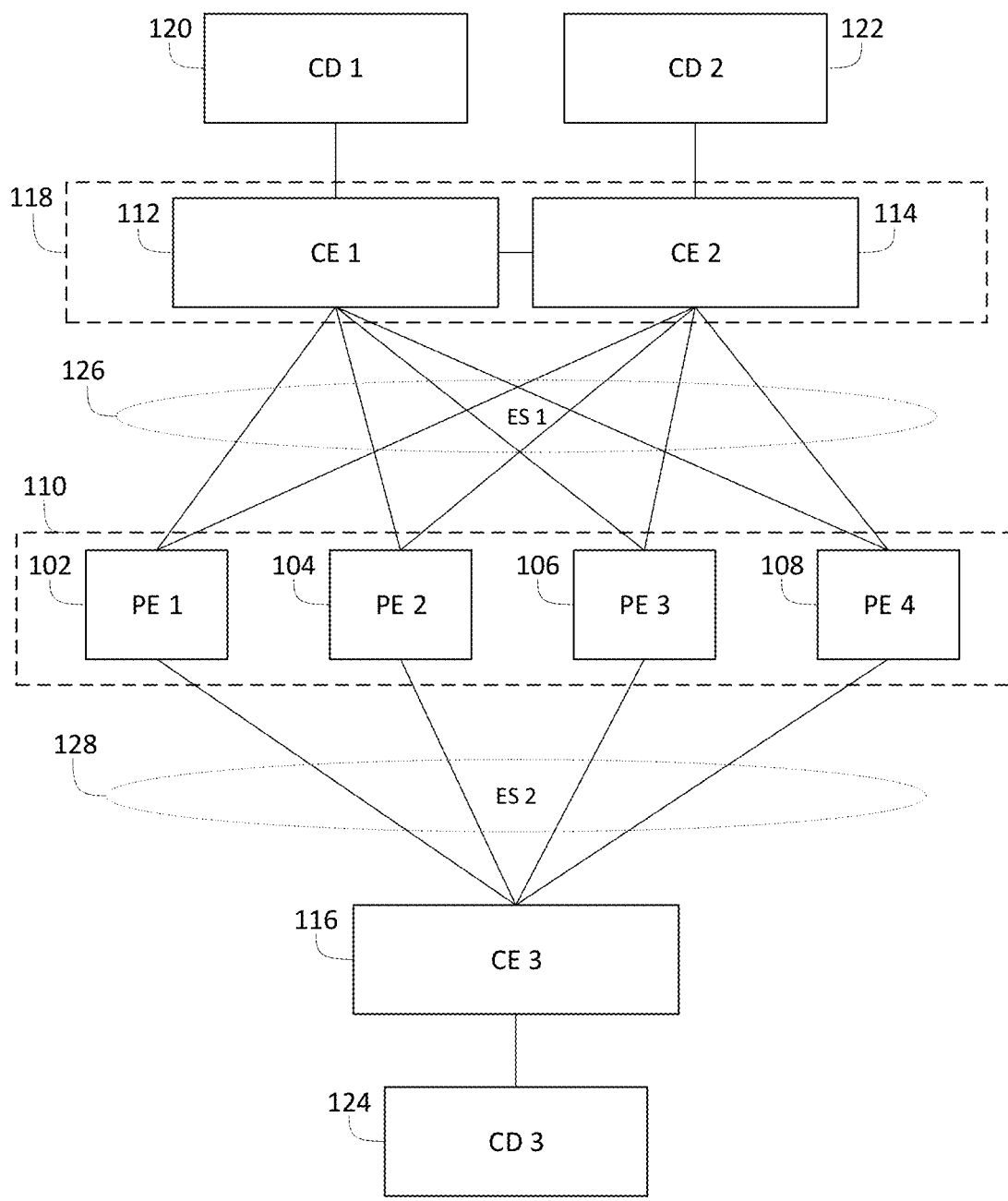
FIG. 1A shows an illustrative network topology of a system for allocating the same ESI label on multihomed peers for a given ES, in accordance with some embodiments of the disclosure.

In some computer networks, network devices, such as provider edge (PE) devices, are configured in multihoming topologies, where two or more network devices provide an active redundant connection to the same host (e.g., customer edge (CE) device). In an ethernet virtual private network (EVPN), the various direct connections between a multihomed host and the redundant network devices are referred to as ethernet segments (ES) and are assigned ethernet segment identifiers (ESI). The redundant network devices advertise to each other and to other network devices with which they maintain an EVPN session, a route (such as an EVPN auto discovery (AD) route) for the ES. An EVPN AD route, referred to as an EVPN AD per ES route, is advertised by the redundant network devices for each ES to which they are directly connected. When a CE device is multihomed to two or more redundant network devices, the network devices are used to reach the packet destination depending on the multihoming mode of operation (e.g., active-standby, active-active, etc.). The redundant network device that is the designated forwarder (DF) device assumes the primary role for forwarding broadcast, unknown-unicast, and multicast (BUM) traffic to the CE device. The DF device or devices are elected as a result of service carving which is well known in the art.

In some instances, the redundant network devices use filtering (e.g., split horizon filtering) to prevent bridging loops. In order to implement this filtering, each redundant device that is connected to an ES advertises an MPLS label that identifies the ES. This label is called the ESI label and redundant devices use the ESI label when filtering received packets. For example, a DF redundant device advertises an ESI label for a first ES to all the redundant network devices connected to the first ES. The redundant network devices add the received ESI label to BUM packets received on the first ES and forward the BUM packets to the DF redundant device. The DF redundant device receives the BUM packets but does not replicate and send the BUM packets towards the first ES because the ESI label indicates that the BUM packets were received from the first ES. This process of labeling and filtering prevents packets from being forwarded on an ES from which they were received, eliminating loops.

Some EVPN multihoming networks use a single ESI label for an ES because the hardware does not support each redundant device advertising different ESI labels for the same ES. In such instances, the network uses conditions to determine when to include the ESI label as described by RFC7432 (BGP MPLS-Based Ethernet VPN, February 2015), which is hereby incorporated herein in its entirety. For example, if a non-DF redundant device receives a BUM packet on a first ES, the non-DF redundant device replicates the packet and sends the replicated BUM packets to all the other redundant network devices connected to the first ES. According to the ESI labeling conditions described in RFC7432, the non-DF redundant device adds the ESI label advertised by the DF redundant device when forwarding the replicated data packet to the DF redundant device. The DF redundant device does not forward the received packet towards the first ES because the ESI label indicates that the packet was received from the first ES. According to the conditions, the non-DF redundant device does not add any ESI labels when forwarding the replicated data packets to the other non-DF redundant devices because the non-DF redundant devices will drop the packets as they are not the elected DF.

The current ESI labeling conditions can result in loops when a new DF election is triggered. For example, if three redundant devices provide multihoming to a CE and one of the redundant device's link to the CE goes down, a DF election is triggered. DF election happens on each redundant device independently and at different points, which can result in transient loops until all the redundant devices have completed the DF election. The first redundant network device can be a non-DF device before the election and become a DF device after the election. If the DF election on the second redundant network device has not completed, the second redundant network device still considers the first redundant network device a non-DF device. In accordance with the ESI labeling conditions, when the second redundant network device replicates a BUM packet received from the CE over the ES, it does not add an ESI label when forwarding the replicated data packet to the first redundant device because the second redundant network device still considers the first redundant network device as a non-DF device. When the first device, which is now the DF device, receives the BUM packet it floods the BUM packet on all ESs because there is no ESI label. This results in the packet being looped back to CE over the ES. In another example, the first redundant network device was the DF device before the election and becomes a non-DF device after the election, but the DF election is not yet complete on the first redundant network device. If the DF election is complete on the second redundant network device, the second redundant network device no longer considers the first redundant network device the DF device. In accordance with the ESI label conditions, when the second redundant network device replicates a BUM packet received from the CE over the ES, it does not add an ESI label when forwarding the replicated data packet to the first redundant device because, as a result of the DF election, the second redundant network device considers the first redundant network device a non-DF device. When the first redundant device, which still considers itself the DF device because the DF election is not yet complete on the first redundant device, receives the BUM packet it floods the BUM packet on all ESs because there is no ESI label. This also results in the packet being looped back to CE over the ES. Accordingly, current techniques lack an efficient methodology for reducing loops when allocating ESI labels in a network using EVPN MPLS multihoming.

Various systems and methods described herein address these problems by providing a method for allocating the same ESI label on multihomed peers for a given ES. In some embodiments, each network device that provides multihoming to a host using an ES, advertises EVPN AD per ES routes to each other, wherein the EVPN AD per ES routes comprise an ESI label associated with the ES. Each redundant network device is configured with the same shared ESI index, which causes each redundant network device to assign the same ESI label to the ES. A first network device of the multihoming network devices determines that the network devices, that provide multihoming to the host using the ES, advertise the same ESI label for the ES. Because the network devices advertise the same ESI label for the ES, the first network device builds a bitmap of the network devices. When the first network device receives a BUM packet from the host via the ES the first network device will replicate the packet generating a plurality of packets. The first network device will add the advertised ESI label to the plurality of packets and use the generated bitmap to forward the plurality of packets to the network devices. Each packet of the plurality of packets is sent to each of the network devices that provide multihoming to the host via the ES. The network devices that consider themselves non-DF devices will drop the packet. The network devices that consider themselves the DF device will not forward the packet to the host via the ES because of the ESI label, thus no loops will be created.

FIG. 1A shows an illustrative network topology of a system 100 for allocating the same ESI label on multihomed peers for a given ES, in accordance with some embodiments of the disclosure. System 100 includes devices (e.g., routers, switches, clients) 102, 104, 106, 108, 112, 114, 116, 120, 122, 124. In some embodiments, links between devices 102, 104, 106, 108, 112, 114, 116, 120, 122, 124 may be an overlay of virtual links configured over an underlay of physical devices.

System 100 is shown as having four provider edge (PE) devices: PE 102, PE 104, PE 106, and PE 108. System 100 is also shown as having three customer edge (CE) devices: CE 112, CE 114, and CE 116. CE 112 and CE 114 are configured in a multi-chassis link aggregation group (MLAG) 118 serving a first client device 120 and a second client device 122, while CE 116 serves a third client device 124. Client devices 120, 122, and 124 may be laptops, desktops, smartphones, and/or any other computing device. One skilled in the art would understand that the same techniques described herein may be used by a system containing any number of PE devices and CE devices servicing any number of ethernet segments and/or hosts. In some embodiments, CE 112, CE 114, and CE 116 may be servers that serve several virtual machines, each with its own Layer 2 address (e.g., MAC address). For example, CE 116 may include a hypervisor managing multiple virtual machine instances.

In the shown embodiment, PE 102, PE 104, PE 106, and PE 108 are redundant devices in a multihoming group 110, where the multihoming group 110 provides multihoming to CE 112, CE 114, and CE 116 using ES links. In an embodiment, when a CE device is multihomed to two or more redundant network devices, the redundant network devices are used to reach the packet destination depending on the multihoming mode of operation (e.g., active-standby, active-active, etc.) and the type of packet. In some embodiments, one of the redundant network devices of the multihoming group 110 is elected as the DF device and assumes the primary role for forwarding BUM packets. In some embodiments, the DF device is elected as a result of a DF election (e.g., service carving) which is well known in the art. In some embodiments, PE 102 is elected as the DF. When a redundant network device receives a BUM packet, it replicates and forwards the BUM packets to the other redundant devices. The non-DF devices will drop the BUM packet and the DF device will forward the BUM packet.

In some embodiments, each redundant device (PE 102, PE 104, PE 106, and PE 108) in multihoming group 110 that is connected to a first ES advertises an MPLS label that identifies the first ES. This label is called the ESI label and redundant devices use the ESI label when filtering received packets. For example, PE 102, PE 104, PE 106, and PE 108 are connected to MLAG 118 using ESs (ES 126). The group of ESs (ES 126) are considered a single ES as a result of MLAG 118. PE 102, PE 104, PE 106, and PE 108 each advertise an ESI label to each other identifying ES 126. In some embodiments, all the redundant devices (PE 102, PE 104, PE 106, and PE 108) of the multihoming group 110 use the same ESI label for ES 126 because the hardware does not support sending different ESI labels for each redundant device of an ES. For example, PE 102, PE 104, PE 106, and PE 108 have direct connections to CE 112 and CE 114 (MLAG 118) so they all advertise a first ESI label (e.g., label 1) for ES 126. In another example, PE 102, PE 104, PE 106, and PE 108 have direct connections to CE 116 and so they all advertise a second ESI label (e.g., label 2) for ES 128.

In some embodiments, the redundant devices (PE 102, PE 104, PE 106, and PE 108) in multihoming group 110 use the ESI labels to implement filtering (e.g., split horizon filtering), which prevents bridging loops. For example, non-DF redundant network devices (e.g., PE 104, PE 106, and PE 108) that receive a replicated BUM packet from the other redundant devices will drop the packet. The DF redundant device (e.g., PE 102) that receives a replicated BUM packet will not forward the packet via ES 126 when a first ESI label is included in the received replicated packet. The first ESI label indicates that the received packet was received via ES 126 so the DF redundant device (e.g., PE 102) will not forward the received packet via ES 126, eliminating bridging loops.

In some embodiments, the redundant devices (PE 102, PE 104, PE 106, and PE 108) of the multihoming group 110 include an ESI label when they advertise an EVPN AD per ES. The redundant devices advertise, to each other and to other network devices with which they maintain an EVPN session, an EVPN AD per ES route for each ES to which they are directly connected. These EVPN AD per ES routes can comprise an ESI label for the ES. For example, PE 102 may advertise an EVPN AD per ES route for ES 126 comprising a first label for ES 126 to PE 104, PE 106, and PE 108. While only MLAG 118 is shown as connected to the redundant devices (PE 102, PE 104, PE 106, and PE 108) of the multihoming group 110 via ES 126, any number of physical and/or virtual customer edge equipment devices may be connected to any of the redundant devices of the multihoming group 110 via ES 126. In another example, PE 102 can advertise a second EVPN AD per ES route for ES 128 comprising a second label for ES 128 to PE 104, PE 106, and PE 108. Similarly, while only CE 116 is shown as connected to the redundant devices (PE 102, PE 104, PE 106, and PE 108) of the multihoming group 110 via ES 128, any number of physical and/or virtual customer edge equipment devices may be connected to any of the redundant devices of the multihoming group 110 via ES 128.

In one approach, when the redundant devices (PE 102, PE 104, PE 106, and PE 108) receive a BUM packet they use conditions to determine when to include an ESI label for an ES in the replicated packets. The conditions cause the ESI label to be included in a replicated BUM packet when sent to the DF redundant device and not to be included in a replicated BUM packet when sent to a non-DF redundant device. In some embodiments, if a non-DF redundant device receives a BUM packet on a first ES, the non-DF redundant device replicates the packet and determines if the replicated packets will include an ESI label according to said conditions. The non-DF redundant device then sends the replicated BUM packets to all the other redundant network devices connected to the first ES. For example, if PE 104 receives a BUM packet via ES 126, it will replicate the BUM packet and send it to PE 102, PE 106, and PE 108. According to said conditions, PE 104 adds the ESI label advertised by PE 102 when forwarding the replicated data packet to PE 102 because PE 102 is the DF redundant device. Further, PE 104 does not add an ESI label when forwarding the replicated data packet to PE 106 or PE 108 because PE 106 and PE 108 are not DF redundant devices. This prevents loops because PE 102 (the DF redundant device) will not forward the BUM packet via ES 126 due to the ESI label included in the replicated packet. PE 106 and PE 108 (the non-DF redundant devices) will not forward the packet via ES 126 because they will drop the received packet as they are non-DF redundant devices.

Figure 1B:
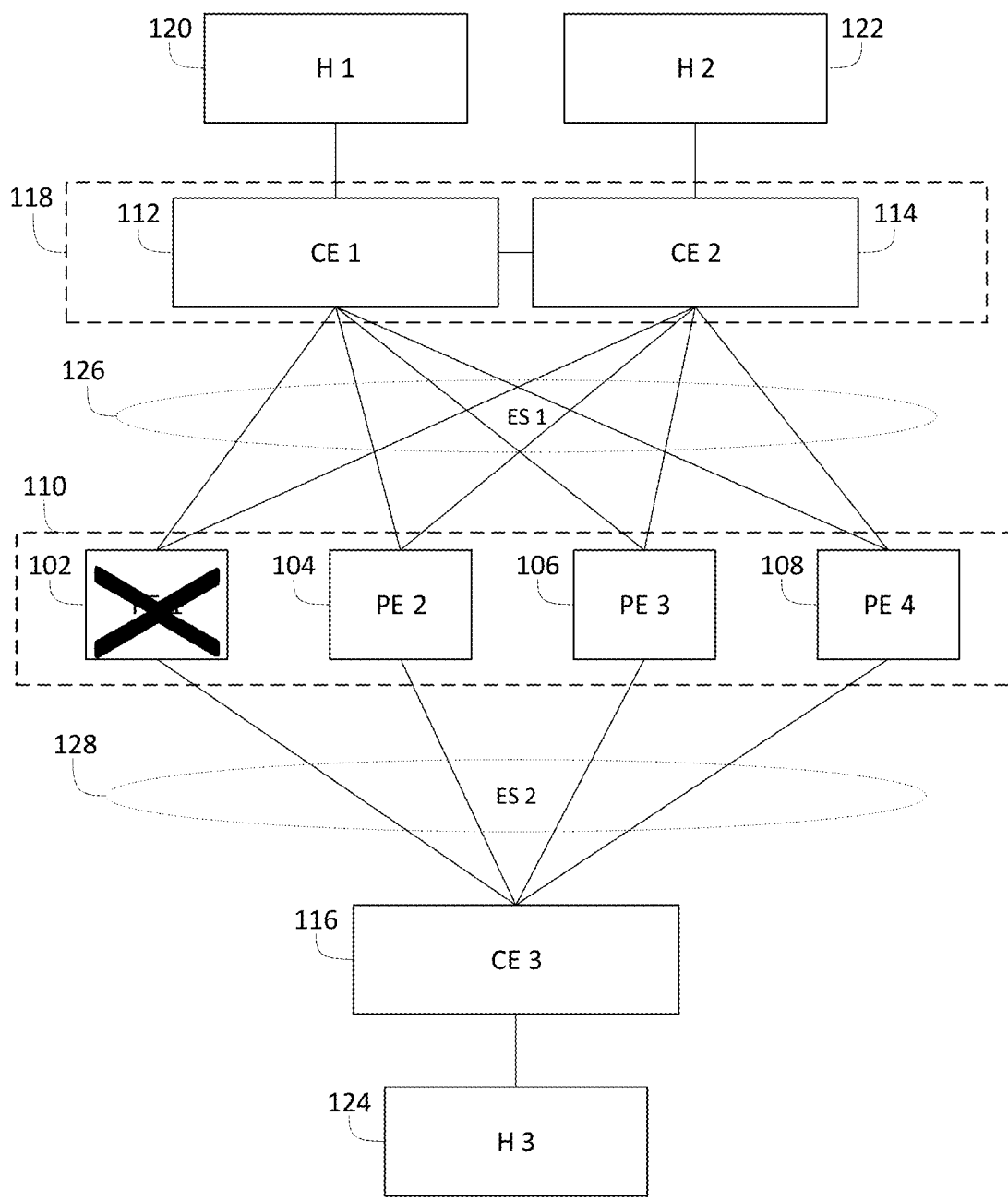
FIG. 1B shows another illustrative network topology of a system for allocating the same ESI label on multihomed peers for a given ES, in accordance with some embodiments of the disclosure.

FIG. 1B shows an illustrative diagram of system 150 for allocating the same ESI label on multihomed peers for a given ES, in accordance with some embodiments of the disclosure. System 150 may have the same devices and links as shown in system 100 except PE 102 may be interrupted, down, or any other situation that results in a new DF election. Such an event can have wide implications in network 150 and can cause bridging loops.

In some embodiments, when a multihoming group has more than three redundant devices a new DF election can cause bridging loops in the condition-based approach, referenced above. In some embodiments, DF election happens on each redundant device (PE 102, PE 104, PE 106, and PE 108) independently and at different points in time. In one embodiment, PE 106 may be a non-DF redundant device before the DF election, but consider itself the DF redundant device after the DF election. If the DF election on PE 104 is not yet completed, PE 104 will still consider PE 102 as the DF redundant device, despite PE 106 being the new DF redundant device. In accordance with the ESI labeling conditions, if PE 104 receives a BUM packet from MLAG 118 via ES 126 it will not add an ESI label when forwarding the replicated BUM packet to PE 106 because PE 104 considers PE 106 as a non-DF device. When PE 106 receives the BUM packet without the ESI label from PE 104 it will flood the BUM packet on all ESs, including ES 126 because there is no ESI label indicating the BUM packet was received via ES 126. This will result in the BUM packet being looped back to MLAG 118 via ES 126.

In another embodiment, PE 108 is the DF redundant device before the election, but becomes a non-DF redundant device after the election. In some embodiments, the DF election has completed on PE 104, which no longer considers PE 108 the DF redundant device. However, the DF election has not completed on PE 108 so PE 108 still considers itself the DF redundant device. In accordance with the ESI label conditions, if PE 104 receives a BUM packet from MLAG 118 via ES 126 it will not add an ESI label when forwarding the replicated BUM packet to PE 108 because PE 104 considers PE 108 as a non-DF device. When PE 108 receives the BUM packet without the ESI label from PE 104 it will flood the BUM packet on all ESs, including ES 126 because PE 108 considers itself the DF redundant device and there is no ESI label indicating the BUM packet was received via ES 126. This will result in the BUM packet being looped back to MLAG 118 via ES 126. Accordingly, the condition-based approach lacks an efficient methodology for reducing loops when allocating ESI labels in a network using EVPN MPLS multihoming.

To overcome this problem, the redundant network devices (PE 102, PE 104, PE 106, and PE 108) can allocate the same ESI label on multihomed peers for a given ES. For example, when PE 104 receives a BUM packet via ES 126, PE 104 replicates the BUM packet to generate a plurality of replicated data packets and forwards the plurality of replicated data packets to the other redundant devices (PE 102, PE 106, and PE 108). The plurality of replicated data packets comprise a first ESI label corresponding to ES 126. The first ESI label was advertised by the redundant network devices as explained above. The other redundant network devices PE 102, PE 106, and PE 108 filter the replicated data packets received from PE 104 based on the first ESI label included in the replicated data packets. For example, any redundant network device that considers itself the DF redundant network device will not flood the BUM packet on ES 126 because the first ESI label is included in the received replicated BUM packet. In some embodiments, this prevents the BUM packet being looped back to MLAG 118 via ES 126 preventing bridging loops.

Figure 2:
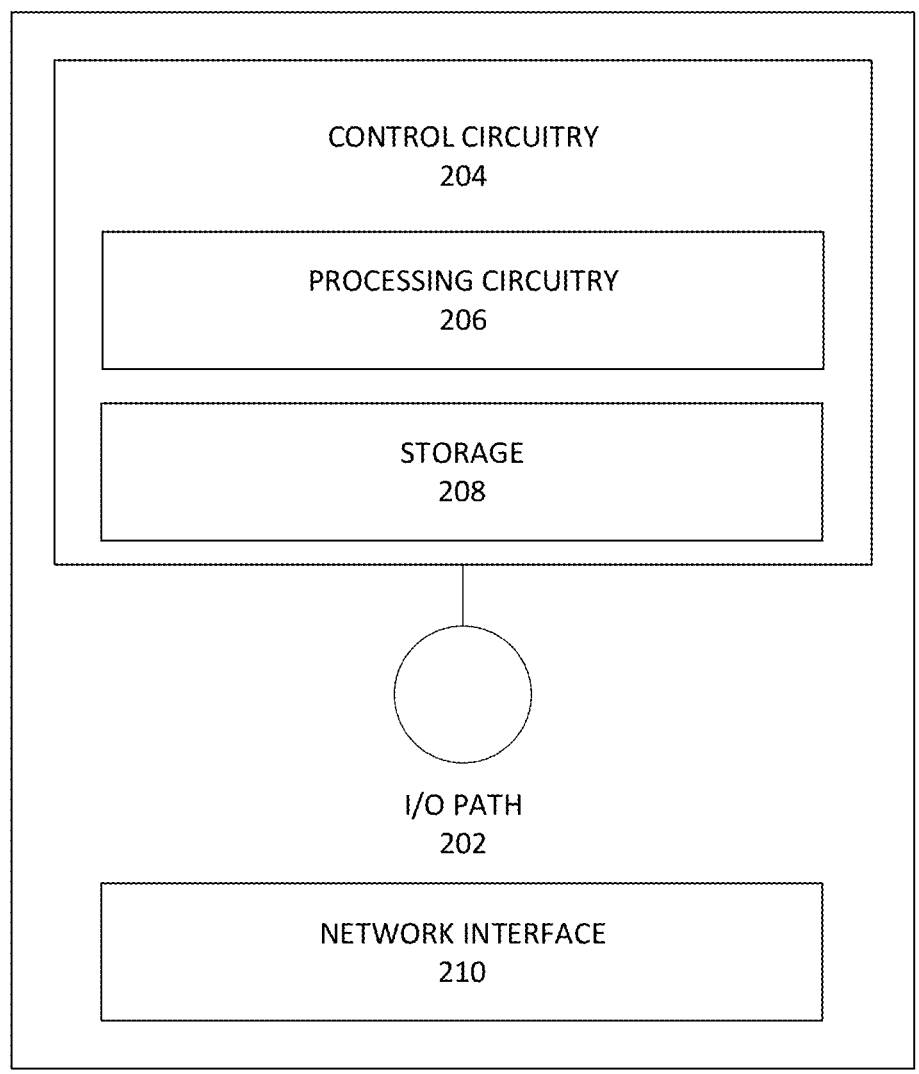
FIG. 2 shows a diagram of an illustrative network device for allocating the same ESI label on multihomed peers for a given ES, in accordance with some embodiments of the disclosure.

FIG. 2 shows a diagram of an illustrative network device for allocating the same ESI label on multihomed peers for a given ES, in accordance with some embodiments of the disclosure. In particular, a device 200 of FIG. 2 may be any of the devices depicted in FIGS. 1A and 1B (e.g., devices 102, 104, 106, and 108) or may be a physical or virtual device hosting any of physical or virtual devices 102, 104, 106, and 108. Device 200 may be a router, an L3 switch, an L2 router, or a host, and/or any other computing device that may be configured to participate in EVPN switching or routing. Device 200 may receive data via data network interface 210 and provide the received data to control circuitry 204 via an input/output (I/O) path 202. Control circuitry 204 includes processing circuitry 206 and storage 208. Storage 208 may include volatile memory (such as random-access memory (RAM), for example, static RAM and/or dynamic RAM), which does not retain its contents when power is turned off, and non-volatile memory (such as, for example, a solid state drive (SSD), a hard disk drive (HDD), electrically erasable programmable read-only memory (EEPROM), etc.), which does retain its contents when power is turned off. Control circuitry 204 may send and receive commands, requests, and other suitable data using I/O path 202. As noted above, I/O path 202 connects control circuitry 204 (and specifically processing circuitry 206) to network interface 210, which in turn connects device 200 to one or more other devices. For example, I/O path 202 may route packets to next hops listed in a forwarding table.

Control circuitry 204 may be based on any suitable processing circuitry, such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 204 executes instructions suitable to implement any of the techniques described above or below.

Storage 208 may be an electronic storage device that is part of control circuitry 204. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 208 may include a table used for forwarding data packets. Multiple circuits may be provided to handle simultaneous processing functions. In some embodiments, device 200 may be a virtual device, wherein components 204, 206, 208, 202 and 210 are virtualized on top of another physical device. In some embodiments, storage 208 may include forwarding tables (e.g., special function Ternary content addressable memories (TCAMs)) and one or more bitmaps.

Figure 3:
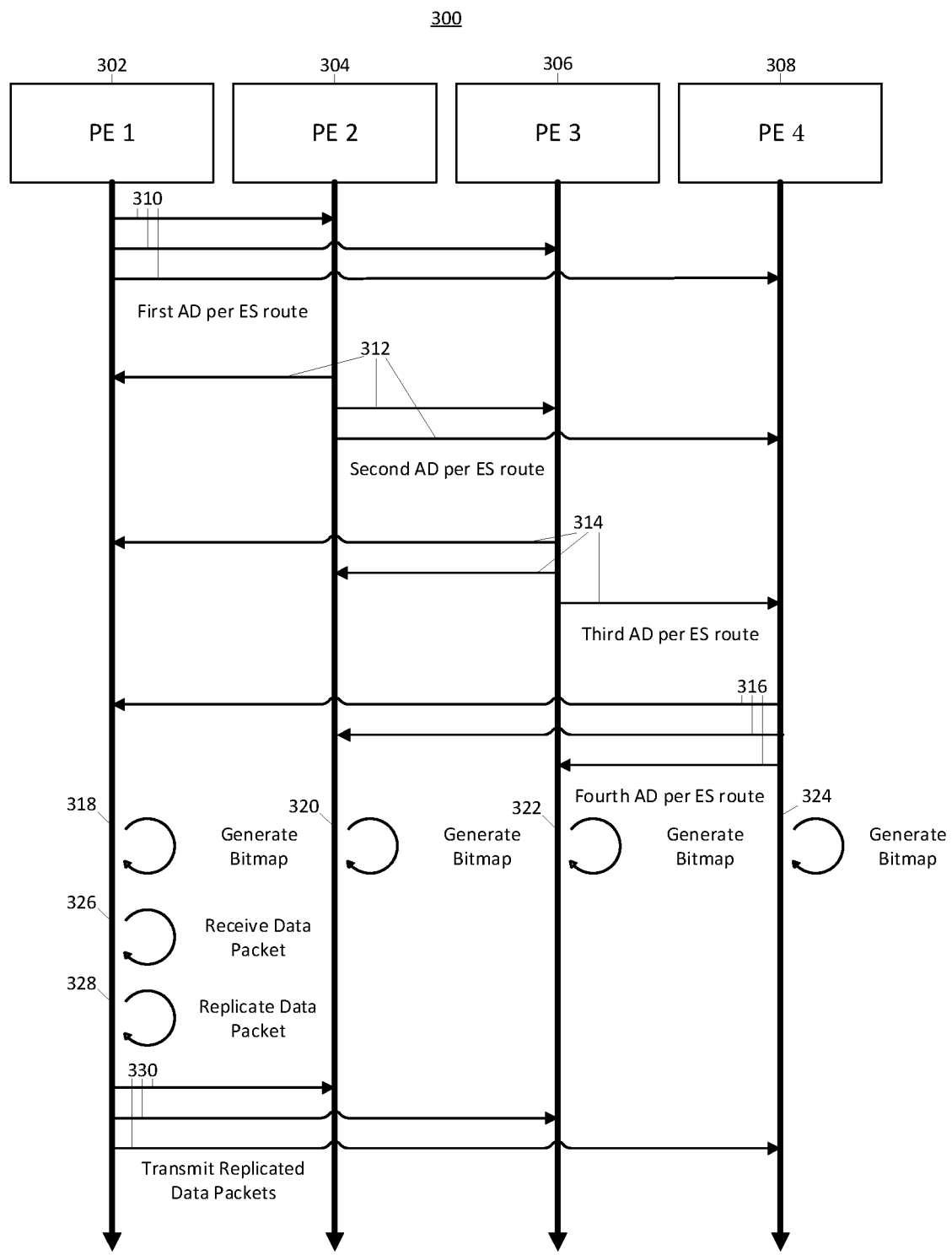
FIG. 3 is a flowchart of an illustrative process for allocating the same ESI label on multihomed peers for a given ES, in accordance with some embodiments of the disclosure.

FIG. 3 is a flowchart of an illustrative process for allocating the same ESI label on multihomed peers for a given ES, in accordance with some embodiments of the disclosure. Process 300 may be performed by physical or virtual control circuitry, such as control circuitry 204 of device 200 (FIG. 2). For example, process 300 may be performed by control circuitries of devices 102, 104, 106, and 108 of FIGS. 1A and 1B. In some embodiments, some steps of process 300 may be performed by one of several devices, for example, PE 302, PE 304, PE 306, PE 308 and, optionally, any other number of PE devices. For example, PE 302, PE 304, PE 306, and PE 308 may correspond respectively to PEs 102, 104, 106, and 108, of FIGS. 1A and 1B. In some embodiments, FIG. 3 occurs after an event causes a DF election, where PE 302 does not consider itself the DF redundant device.

At step 310, PE 302 advertises, to PE 304, PE 306, and PE 308 a first AD per ES route for an ES to which PE 302 is directly connected. In some embodiments, a first ESI label for the ES is included in the first AD per ES route. In some embodiments, PE 302 is configured to use a certain shared ESI label for ESs that PE 302 shares with the other redundant network devices (PE 304, PE 306, PE 308). For example, PE 302 can use a table that maps certain ESs to certain ESI labels. In some embodiments, all redundant network devices (PE 302, PE 304, PE 306, PE 308) are configured to use the same ESI label for ESs shared with the other redundant network devices.

At step 312, PE 304 advertises, to PE 302, PE 306, and PE 308 a second AD per ES route for the ES to which PE 304 is directly connected. In some embodiments, the first ESI label for the ES is included in the second AD per ES route because PE 304 is configured to use the same ESI label for ESs that are shared with the other redundant network devices (PE 302, PE 306, and PE 308). In some embodiments, PE 304 selects the first ESI label based on a table that maps the ES to the first ESI label.

At step 314, PE 306 advertises, to PE 302, PE 304, and PE 308 a third AD per ES route for the ES to which PE 306 is directly connected. In some embodiments, the first ESI label for the ES is included in the third AD per ES route because PE 306 is configured to use the same ESI label for ESs that are shared with the other redundant network devices (PE 302, PE 304, and PE 308). In some embodiments, PE 306 selects the first ESI label based on a table that maps the ES to the first ESI label.

At step 316, PE 308 advertises, to PE 302, PE 304, and PE 306 a fourth AD per ES route for the ES to which PE 308 is directly connected. In some embodiments, the first ESI label for the ES is included in the fourth AD per ES route because PE 308 is configured to use the same ESI label for ESs that are shared with the other redundant network devices (PE 302, PE 304, and PE 306). In some embodiments, PE 308 selects the first ESI label based on a table that maps the ES to the first ESI label.

At step 318, PE 302 generates a first bitmap. In some embodiments, the first bitmap is generated after PE 302 receives an AD per ES route from each redundant network device servicing the ES, where all the received AD per ES routes include the same ESI label (e.g., the first ESI label) for the ES. In some embodiments, the first bitmap indicates an ESI label to use when forwarding packets (e.g., a replicated BUM packet) to the other redundant network devices (PE 304, PE 306, and PE 308) based on the ES the BUM packet was received from and the received ESI labels corresponding to the ES. For example, because PE 302 receives the second AD per ES route, the third AD per ES route, and the fourth AD per ES route from the other redundant network devices servicing the ES and all the received AD per ES routes include the first ESI label, PE 302 generates the first bitmap. When PE 302 forwards a replicated BUM packet, associated with the ES, to the other redundant network devices (PE 304, PE 306, and PE 308), PE 302 includes the first ESI label according to the first bitmap.

At step 320, PE 304 generates a second bitmap. In some embodiments, PE 304 generates the second bitmap using the same or similar methodologies described in step 318. For example, because PE 304 receives the first AD per ES route, the third AD per ES route, and the fourth AD per ES route from the other redundant network devices servicing the ES and all the received AD per ES routes include the first ESI label, PE 304 generates the second bitmap. In some embodiments, when PE 304 forwards a replicated BUM packet, associated with the ES, to the other redundant network devices (PE 302, PE 306, and PE 308), PE 304 includes the first ESI label according to the second bitmap.

At step 322, PE 306 generates a third bitmap. In some embodiments, PE 306 generates the third bitmap using the same or similar methodologies described in step 318. For example, because PE 306 receives the first AD per ES route, the second AD per ES route, and the fourth AD per ES route from the other redundant network devices servicing the ES and all the received AD per ES routes include the first ESI label, PE 306 generates the third bitmap. In some embodiments, when PE 306 forwards a replicated BUM packet, associated with the ES, to the other redundant network devices (PE 302, PE 304, and PE 308), PE 306 includes the first ESI label according to the third bitmap.

At step 324, PE 308 generates a fourth bitmap. In some embodiments, PE 308 generates the fourth bitmap using the same or similar methodologies described in step 318. For example, because PE 308 receives the first AD per ES route, the second AD per ES route, and the third AD per ES route from the other redundant network devices servicing the ES and all the received AD per ES routes include the first ESI label, PE 308 generates the fourth bitmap. In some embodiments, when PE 308 forwards a replicated BUM packet, associated with the ES, to the other redundant network devices (PE 302, PE 304, and PE 306), PE 308 includes the first ESI label according to the fourth bitmap.

At step 326, PE 302 receives a data packet via the ES. In some embodiments, PE 302 determines that the data packet is a BUM packet. At step 328, PE 302 replicates the BUM packet. In some embodiments, PE 302 includes an ESI label when generating the replicated packets. In some embodiments, PE 302 determines which ESI label to include based on the first bitmap. Because PE 304, PE 306, and PE 308, all advertised the first ESI label for the ES, PE 302 includes the first ESI label with the replicated packets.

At step 330, PE 302 forwards the replicated packets to the other redundant network devices (PE 304, PE 306, and PE 308) that provide multihoming via the ES. In some embodiments, the redundant network devices that consider themselves non-DF devices drop the replicated packets and the network devices that consider themselves the DF device do not forward the packet via the ES because of the first ESI label, thus no bridging loops are created.

FIG. 4 is a flowchart of an illustrative process for allocating the same ESI label on multihomed peers for a given ES, in accordance with some embodiments of the disclosure. In some embodiments, FIG. 4 comprises similar or the same steps as FIG. 3. In some embodiments, FIG. 4 describes implementations of one, some, or all of the steps described in FIG. 3. Process 400 may be performed by physical or virtual control circuitry, such as control circuitry 204 of device 200 (FIG. 2). For example, process 400 may be performed by control circuitries of devices 102, 104, 106, and 108 of FIGS. 1A and 1B.

At step 402, control circuitry receives EVPN AD per ES routes from all of the redundant network devices of a multihoming group, wherein the EVPN AD per ES routes comprise the same ESI label for an ES. In some embodiments, for example, control circuitry receives a first EVPN AD per ES route that comprises the ESI label for the ES from a first network device. In some embodiments, the control circuitry and the first network device are part of a multihoming group providing EVPN MPLS multihoming to a first host via the ES. In some embodiments, the first EVPN AD per ES route is one of two or more EVPN AD per ES routes received from one or more redundant network devices of the multihoming group, where the two or more EVPN AD per ES routes comprise the same ESI label for the ES. In some embodiments, control circuitry generates a first bitmap in response to receiving the EVPN AD per ES routes from all of the redundant network devices of the multihoming group, wherein the EVPN AD per ES routes comprise the same ESI label for the ES. In some embodiments, the bitmap comprises a plurality of entries, where an entry or entries can indicate ESI labels to use when forwarding packets. In some embodiments, the generated bitmap indicates that the received ESI label should be used when forwarding certain packets (e.g., a replicated BUM packet), associated with the ES, to the first network device.

At step 404, control circuitry receives a data packet via the ES from a first host, wherein the data packet is a BUM packet.

At step 406, control circuitry replicates the data packet to generate a plurality of replicated data packets, wherein the plurality of replicated data packets comprises the ESI label. In some embodiments, control circuitry determines the ESI label based on the bitmap. Because the first network device advertised the ESI label for the ES, the control circuitry includes the ESI label with the plurality of replicated packets.

At step 408, control circuitry transmits the plurality of data packets to each network device providing multihoming via the ES to the host. In some embodiments, one or more of the other network devices considers itself a non-DF device and drops the received replicated packet. In some embodiments, one other network device considers itself the DF device and does not forward the received replicated packet via the ES because of the first ESI label.

Figure 5:
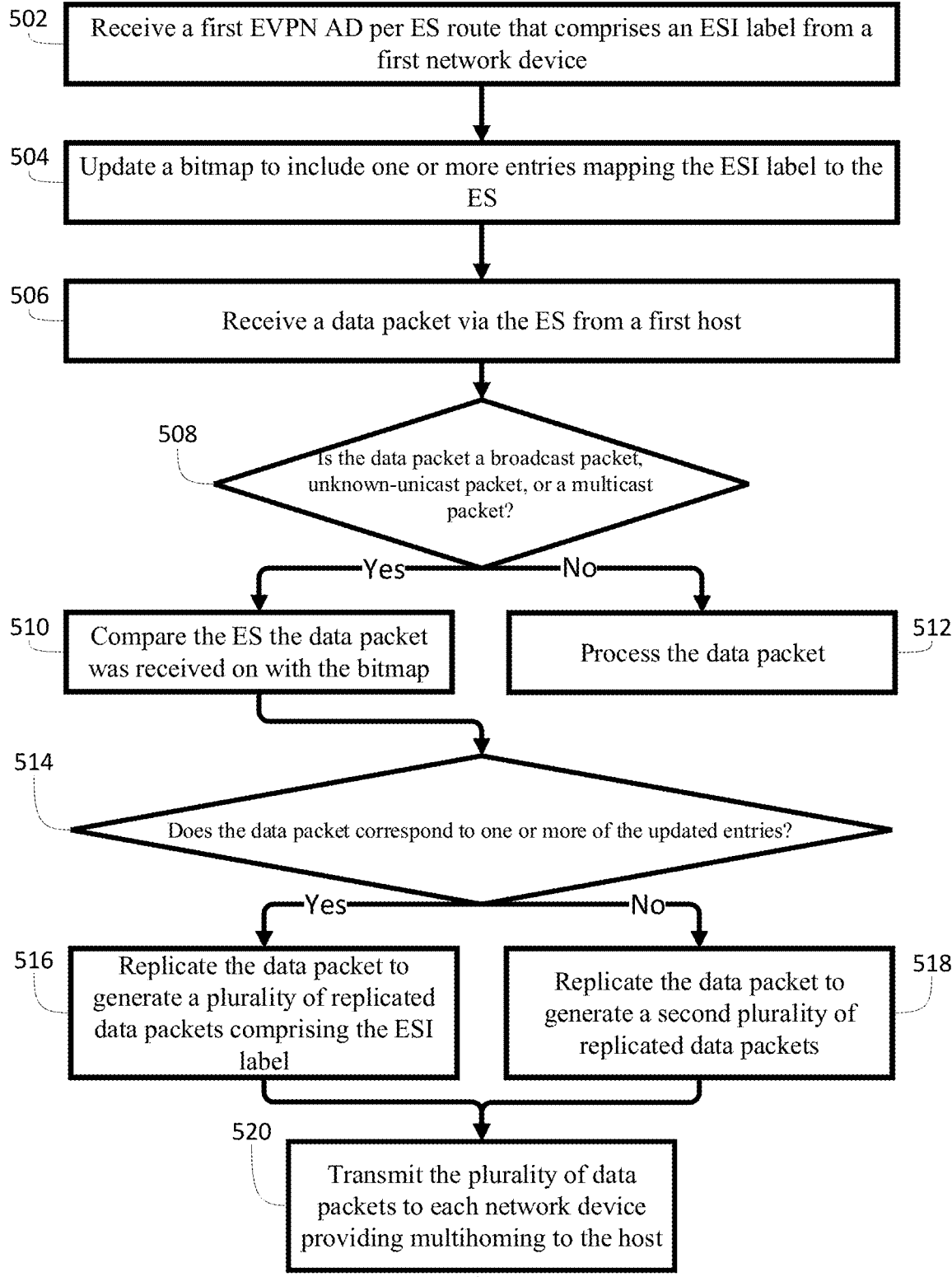
FIG. 5 is another flowchart of an illustrative process for allocating the same ESI label on multihomed peers for a given ES, in accordance with some embodiments of the disclosure.

FIG. 5 is a flowchart of an illustrative process for allocating the same ESI label on multihomed peers for a given ES, in accordance with some embodiments of the disclosure. In some embodiments, FIG. 5 comprises similar or the same steps as FIG. 3 and FIG. 4. In some embodiments, FIG. 5 describes specific implementations of one, some, or all of the steps described in FIG. 3 and FIG. 4. Process 500 may be performed by physical or virtual control circuitry, such as control circuitry 204 of device 200 (FIG. 2). For example, process 500 may be performed by control circuitries of devices 102, 104, 106, and 108 of FIGS. 1A and 1B.

At step 502, control circuitry receives a first EVPN AD per ES route that comprises an ESI label for an ES from a first network device. In some embodiments, the control circuitry and the first network device are part of a multihoming group providing EVPN MPLS multihoming to the first host via the ES. In some embodiments, the first network device advertises the first AD per ES route for the ES to each network device with which it maintains an EVPN session. In some embodiments, the first network device advertises an EVPN AD per ES route for each ES to which it is directly connected. In some embodiments, the first EVPN AD per ES route is one of two or more EVPN AD per ES routes received from two or more redundant network devices of the multihoming group, where the two or more EVPN AD per ES routes comprise the same ESI label for the ES.

At step 504, control circuitry generates a bitmap to include one or more entries mapping the received ESI label to the ES. In some embodiments, the bitmap comprises a plurality of entries, where an entry or entries can indicate ESI labels to use when forwarding packets. In some embodiments, generating a bitmap corresponds to creating a new bitmap or updating one or more entries in an existing bitmap. In some embodiments, one or more entries mapping the received ESI label to the ES is generated and/or updated in the bitmap. In some embodiments, the generated bitmap indicates that the received ESI label is used when forwarding certain packets (e.g., a replicated BUM packet), associated with the ES, to the first network device. In some embodiments, the bitmap is generated after all redundant network devices of the multihoming group exchange EVPN AD per ES routes comprising the same ESI label for the ES.

At step 506, control circuitry receives a data packet via the ES from a first host, wherein the data packet is a BUM packet.

At step 508, control circuitry determines if the received data packet is a BUM packet. If control circuitry determines that the received packet is a BUM packet, process 500 continues to step 510. If control circuitry determines that the received packet is not a BUM packet, the process 500 continues to step 512. At step 512, control circuitry processes the data packet. In some embodiments, control circuitry forwards the data packet based on the type of packet.

At step 510, control circuitry compares the ES the packet was received on with the bitmap. For example, control circuitry determines if the ES the packet was received on is associated with one or more entries of the bitmap.

At step 514, control circuitry determines whether the data packet corresponds to one or more of the updated entries described in step 504. In some embodiments, the control circuitry uses the ES that the data packet was received on, the type of data packet, and/or similar such information to determine if the data packet corresponds to one or more of the updated entries described in step 504. If control circuitry determines that the data packet does correspond to one or more of the updated entries described in step 504, the process 500 continues to step 516. If control circuitry determines that the data packet does not correspond to one or more of the updated entries described in step 504, the process 500 continues to step 518.

At step 516, control circuitry replicates the data packet to generate a plurality of replicated data packets, wherein the plurality of replicated data packets comprises the ESI label. In some embodiments, control circuitry determines that the ESI label received from the first network device is to be included with the replicated data packets based on one or more of the updated entries of the bitmap described in step 504.

At step 518, control circuitry replicates the data packet to generate a second plurality of replicated data packets. In some embodiments, the control circuitry uses one or more conditions to determine whether to include a second ESI label with the replicated data packets. In some embodiments, a network device advertises the second ESI label in a second EVPN AD per ES route. In some embodiments, the one or more conditions cause the second ESI label to be included in a replicated BUM packet, when the replicated BUM packet is sent to the DF redundant device. In some embodiments, the one or more conditions cause the second ESI label not to be included in a replicated BUM packet, when the replicated BUM packet is sent to a non-DF redundant device.

At step 520, control circuitry transmits the first or second plurality of replicated data packets to each network device providing multihoming to the host. In some embodiments, the first network device receives a replicated data packet from the control circuitry. In some embodiments, the one or more network devices considers itself a non-DF device and drops the replicated packet. In some embodiments, the one other network device considers itself the DF device and does not replicate and send the received packet via the ES because of the first ESI label.

The processes 300, 400, and 500 described above are intended to be illustrative and not limiting. More generally, the above disclosure is meant to be illustrative and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
receiving, by a first network device, a first ethernet virtual private network (EVPN) auto discovery (AD) route for an ethernet segment (ES) that comprises an ES identifier (ESI) label from a second network device;
receiving, by the first network device, a data packet via the ES from a host, wherein the data packet is a broadcast packet, unknown-unicast packet, or a multicast packet;
generating, by the first network device, a bitmap in response to receiving a plurality of EVPN AD routes for the ES, wherein each of the plurality of EVPN AD routes for the ES comprises the ESI label;
replicating, by the first network device, the data packet to generate a plurality of replicated data packets using the bitmap, wherein each of the plurality of replicated data packets comprises the ESI label;
transmitting, by the first network device, the plurality of data packets to the second network device and a third network device, wherein the first network device, the second network device, and the third network device provide multihoming using the ES to the host, wherein at least one of the network devices is not a designated forwarding device.

2. The method of claim 1, wherein at least one of the network devices is a designated forwarding device.

3. The method of claim 1, further comprising, determining, by the first network device, that one of the network devices providing multihoming using the ES to the host is a designated forwarding device based on a first designated forwarding device election at the first network device.

4. The method of claim 3, wherein at least one of the network devices providing multihoming using the ES to the host has not determined the designated forwarding device based on a second designated forwarding device election at the at least one network device.

5. The method of claim 3, wherein the designated forwarding device election occurs in response to one of the network devices providing multihoming using the ES to the host losing connection to the ES.

6. The method of claim 1, further comprising, transmitting, by the first device, a second EVPN AD for the ES to each network device providing multihoming using the ES to the host, wherein the second EVPN AD comprises the ESI label.

7. The method of claim 1, further comprising designating at least one of the network devices as a forwarding device after an event occurs.

8. An apparatus comprising:
control circuitry; and
at least one memory including computer program code for one or more programs, the at least one memory and the computer program code configured to, with the control circuitry, cause the apparatus to perform at least the following:
receive a first ethernet virtual private network (EVPN) auto discovery (AD) route for an ethernet segment (ES) that comprises an ES identifier (ESI) label from a first network device;
generate a bitmap in response to receiving a plurality of EVPN AD routes for the ES, wherein each of the plurality of EVPN AD routes for the ES comprises the ESI label;
receive a data packet via the ES from a host, wherein the data packet is a broadcast packet, unknown-unicast packet, or a multicast packet;
replicate the data packet to generate a plurality of replicated data packets using the bitmap, wherein each of the plurality of replicated data packets comprises the ESI label;
transmit the plurality of data packets to the first network device and a second network device, wherein the apparatus, and the first network device and the second network device provide multihoming using the ES to the host.

9. The apparatus of claim 8, wherein at least one of the first network device and the second network device is a designated forwarding device.

10. The apparatus of claim 8, wherein the apparatus is further caused to determine that one of the network devices providing multihoming using the ES to the host is a designated forwarding device based on a first designated forwarding device election.

11. The apparatus of claim 10, wherein at least one of the network devices providing multihoming using the ES to the host has not determined the designated forwarding device based on a second designated forwarding device election at the at least one network device.

12. The apparatus of claim 10, wherein the designated forwarding device election occurs in response to one of the network devices providing multihoming using the ES to the host losing connection to the ES.

13. The apparatus of claim 8, wherein the apparatus is further caused to transmit a second EVPN AD per ES route for the ES to each network device providing multihoming using the ES to the host, wherein the second EVPN AD comprises the ESI label.

14. The apparatus of claim 8, wherein the apparatus is further caused to designate at least one of the network devices as a forwarding device after an event occurs.

15. A non-transitory computer-readable medium having instructions encoded thereon that when executed by control circuitry cause the control circuitry to:
receive a first ethernet virtual private network (EVPN) auto discovery (AD) route for an ethernet segment (ES) that comprises an ES identifier (ESI) label from a first network device;
generate a bitmap in response to receiving a plurality of EVPN AD routes for the ES, wherein each of the plurality of EVPN AD routes for the ES comprises the ESI label;
receive a data packet via the ES from a host, wherein the data packet is a broadcast packet, unknown-unicast packet, or a multicast packet;
replicate the data packet to generate a plurality of replicated data packets using the bitmap, wherein each of the plurality of replicated data packets comprises the ESI label;
transmit the plurality of data packets to the first network device and a second network device, wherein the control circuitry, the first network device, and the second network device provide multihoming using the ES to the host, wherein at least one of the first network device and the second network device is not a designated forwarding device.

16. The non-transitory computer-readable medium of claim 15, wherein at least one of the first and second network devices is a designated forwarding device.

17. The non-transitory computer-readable medium of claim 15, wherein the control circuitry is further caused to determine that one of the network devices providing multihoming using the ES to the host is a designated forwarding device based on a first designated forwarding device election.

18. The non-transitory computer-readable medium of claim 17, wherein at least one of the network devices providing multihoming using the ES to the host has not determined the designated forwarding device based on a second designated forwarding device election at the at least one network device.

19. The non-transitory computer-readable medium of claim 17, wherein the designated forwarding device election occurs in response to one of the network devices providing multihoming using the ES to the host losing connection to the ES.

20. The non-transitory computer-readable medium of claim 15, wherein the control circuitry is further caused to transmit a second EVPN AD for the ES to each network device providing multihoming using the ES to the host, wherein the second EVPN AD comprises the ESI label.

* * * * *